(12) United States Patent
Sakamoto et al.

(10) Patent No.: US 6,418,993 B1
(45) Date of Patent: Jul. 16, 2002

(54) PNEUMATIC TIRE

(75) Inventors: Masayuki Sakamoto; Susumu Tanaka, both of Shirakawa; Hiroshi Matsui, Kakogawa, all of (JP)

(73) Assignee: Sumitomo Rubber Industries, Ltd., Hyogo-ken (JP)

( * ) Notice: Subject to any disclaimer, the term of this patent is extended or adjusted under 35 U.S.C. 154(b) by 0 days.

(21) Appl. No.: 09/386,139

(22) Filed: Aug. 31, 1999

(30) Foreign Application Priority Data

| Aug. 31, 1998 | (JP) | ............................................. | 10-245718 |
| Aug. 31, 1998 | (JP) | ............................................. | 10-245719 |
| Oct. 29, 1998 | (JP) | ............................................. | 10-308984 |

(51) Int. Cl.$^7$ ........................ B60C 15/024; B60C 13/02
(52) U.S. Cl. ........................ 152/539; 152/544; 152/523
(58) Field of Search .............................. 152/501, 539, 152/544, 547, 543, 523

(56) References Cited

U.S. PATENT DOCUMENTS

| 2,822,016 A | * | 2/1958 | Billingsley | ................... 152/523 |
| 3,515,196 A | * | 6/1970 | Floria | ......................... 152/454 |
| 3,648,748 A | * | 3/1972 | Lovell | ..................... 152/209.5 |
| 3,983,920 A | * | 10/1976 | Gardner et al. | ............. 152/522 |
| 4,057,092 A | | 11/1977 | Tracy | |
| 4,308,907 A | | 1/1982 | Monzini | |

FOREIGN PATENT DOCUMENTS

| FR | 1427189 | | 4/1966 |
| JP | 03082611 | * | 4/1991 |
| JP | 05294115 | * | 11/1993 |
| JP | 8-282218 | | 10/1996 |

* cited by examiner

*Primary Examiner*—Michael W. Ball
*Assistant Examiner*—Justin Fischer
(74) *Attorney, Agent, or Firm*—Birch, Stewart, Kolasch & Birch, LLP

(57) ABSTRACT

A pneumatic tire is provided in at least one of sidewall portions with a wheelrim protector which overhangs a flange of a wheelrim and protrudes axially outwardly from the axially outer end of the flange, the wheelrim protector is provided with at least one circumferential slit around the axis of the tire. In case of a slit extending continuously in the tire circumferential direction, the slit can be formed in a wedge-shaped cross sectional shape. In case of discontinuous slits, the slits are arranged around the tire axis and inclined with respect to the adjacent carcass cords at 45 to 80 degrees.

12 Claims, 15 Drawing Sheets

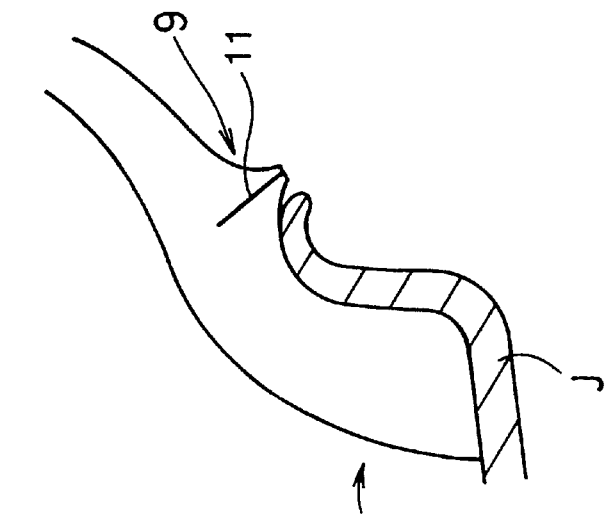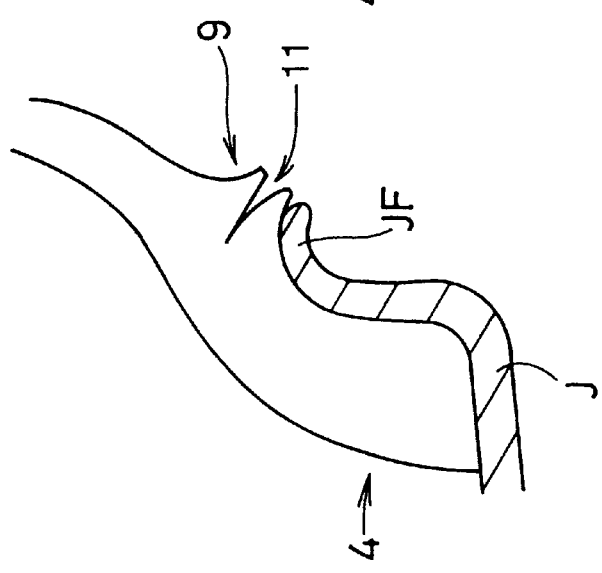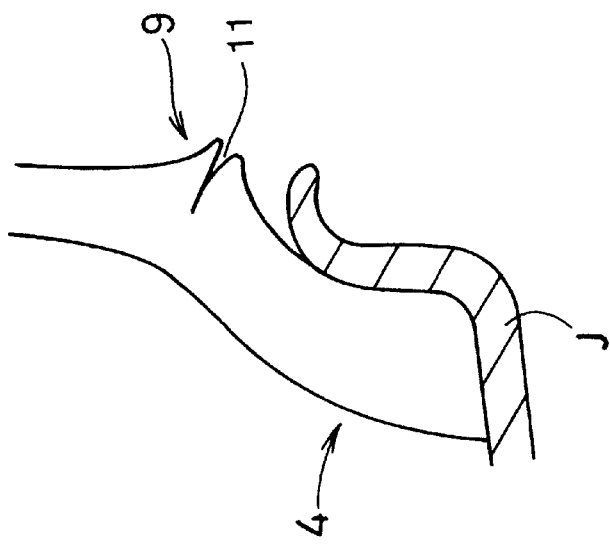

PNEUMATIC TIRE

BACKGROUND OF THE INVENTION

The present invention relates to a pneumatic tire having an improved wheelrim protector being capable of improving high speed cornering performance, ride comfort and the like.

In a pneumatic tire having a low aspect ratio of less than 50%, as the tire section height is very low, the distance between the wheelrim flange and road surface is short. Therefore, there is a strong possibility that the flange contacts with curbs, objects on the ground and the like, and suffers damage therefrom.

As a technique of preventing wheelrim flanges from such damage, a wheelrim protector (d) as shown in FIG. 19 has been proposed. The protector (d) is disposed in each sidewall portion near the bead (b) and protrudes axially outwardly from the axially outmost end of the flange (jf) and extends continuously in the circumferential direction.

Such protector increases the rubber thickness of the sidewall portion, and a flexible region of the sidewall portion decreases. As a result, ride comfort deteriorates, and shocks received from the road surface during running are more transmitted to the bead portion and the bead durability greatly decreases.

Further, the tire rigidity suddenly alters during cornering if there is occurred a change from a situation wherein the protector does not contact with the flange to a situation wherein the protector contacts with the flange as shown in FIG. 19 by chain line. Therefore, if such change occurs during high speed cornering it becomes difficult to control the behavior of the car.

It is therefore, an object of the present invention to provide a pneumatic tire having a wheelrim protector in which the ride comfort, controllability during high speed cornering and the like are improved.

SUMMARY OF THE INVENTION

According to the present invention, a pneumatic tire comprises
  a tread portion,
  a pair of sidewall portions,
  a pair of bead portions,
  a carcass extending between the bead portions,
  a wheelrim protector provided in at least one of the sidewall portions so as to overhang a flange of a wheelrim when the tire is mounted thereon and to protrude axially outwardly from an axially outer end of the flange, and
  the wheelrim protector provided with at least one circumferential slit around the axis of the tire.

In the present invention, the circumferential slit is meant as a circumferentially continuous slit or discontinuous slits having such a length that the circumferential component is larger than the radial component.

DESCRIPTION OF THE DRAWINGS

Embodiments of the present invention will now be described in detail in conjunction with the accompanying drawings.

FIGS. 9(A) to 9(C) are schematic cross sectional views for explaining a function of the slit.

DETAILED DESCRIPTION OF THE INVENTION

Figure 1:
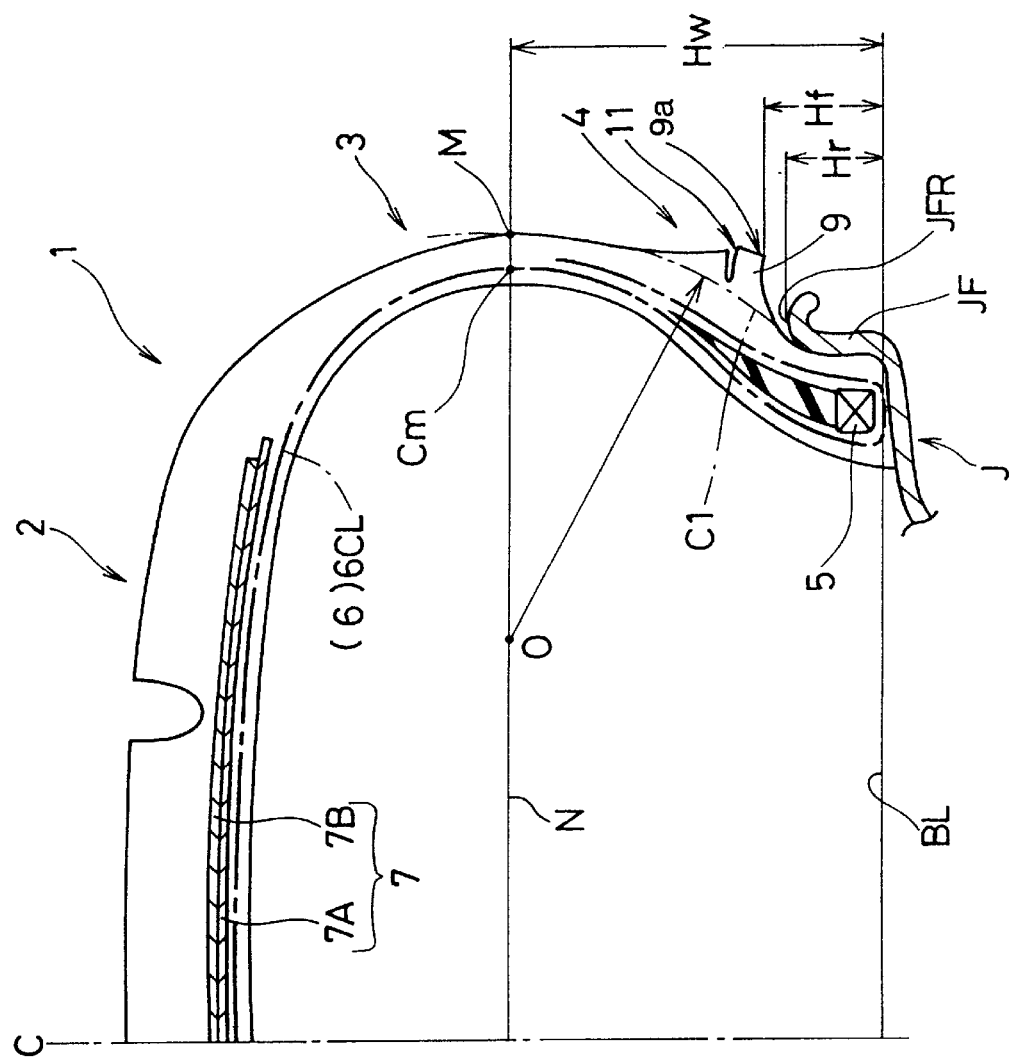
FIG. 1 is a cross sectional view of an embodiment of the present invention.

In the drawings, pneumatic tires 1 according to the present invention comprises a tread portion 2, a pair of sidewall portions 3, a pair of bead portions 4 with a bead core 5 therein, a carcass 6 extending between the bead portions 4, and a belt 7 disposed radially outside the carcass 6 in the tread portion 2.

Normal Condition

Hereinafter, various sizes or dimensions of the tire are measured under the following normal condition if not specifically mentioned. The normal condition is that the tire is mounted on a standard rim and inflated to a standard load but loaded with no tire load. The standard rim is the "standard rim" specified in JATMA, the "Measuring Rim" in ETRTO, the "Design Rim" in TRA or the like. The standard pressure is the "maximum air pressure" in JATMA, the "Inflation Pressure" in ETRTO, the maximum pressure given in the "Tire Load Limits at Various Cold Inflation Pressures" table in TRA or the like. The standard load is the "maximum load capacity" in JATMA, the "Load Capacity" in ETRTO, the maximum value given in the above-mentioned table in TRA or the like.

Carcass

The carcass 6 comprises at least one ply of cords arranged radially at an angle of 70 to 90 degrees with respect to the tire equator C.

For the carcass cords, organic fiber cords, e.g. polyester, nylon, rayon and the like are preferably used, but steel cords may be also used.

Figure 7:
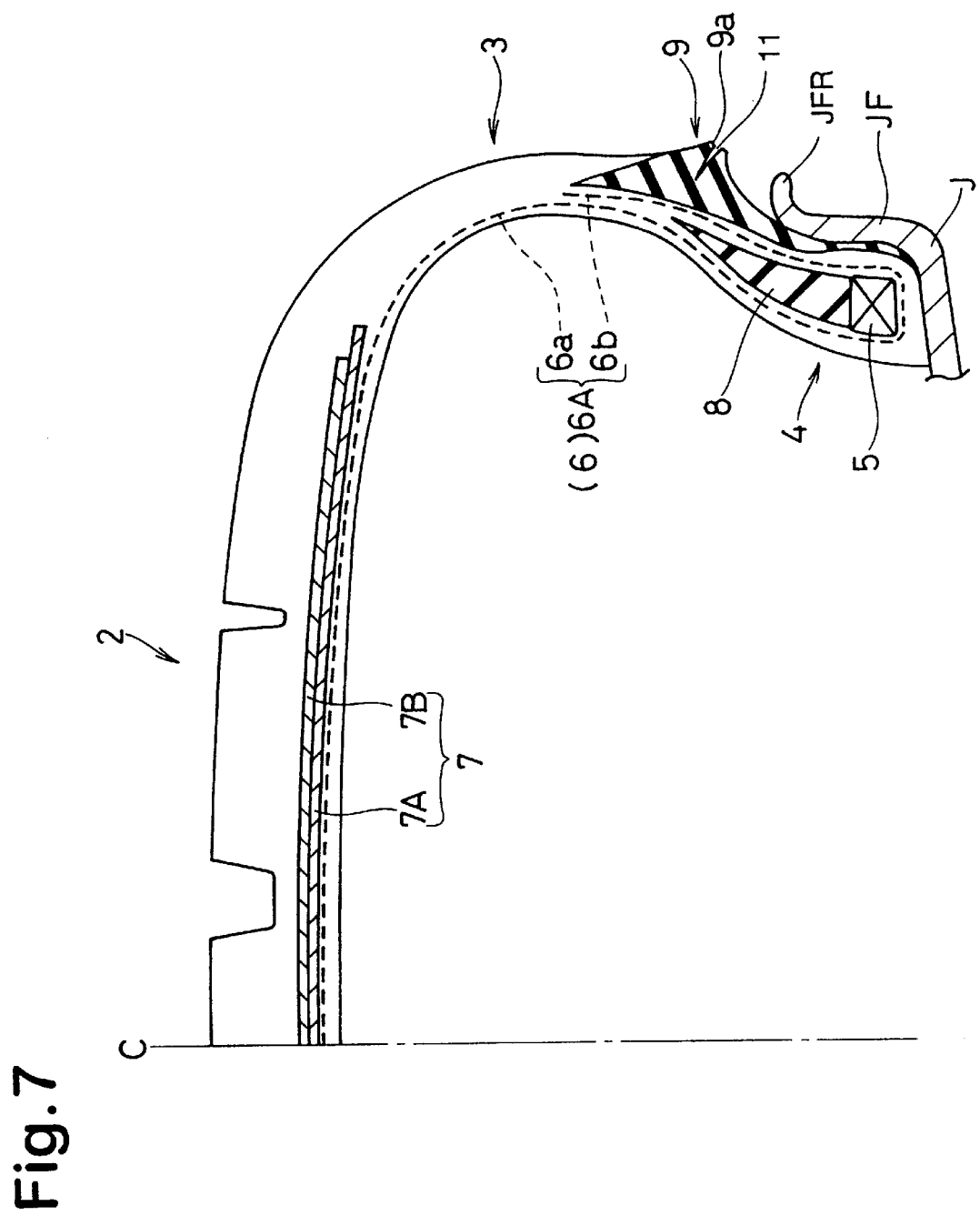
FIG. 7 is a cross sectional view of another embodiment of the present invention.
Figure 12:
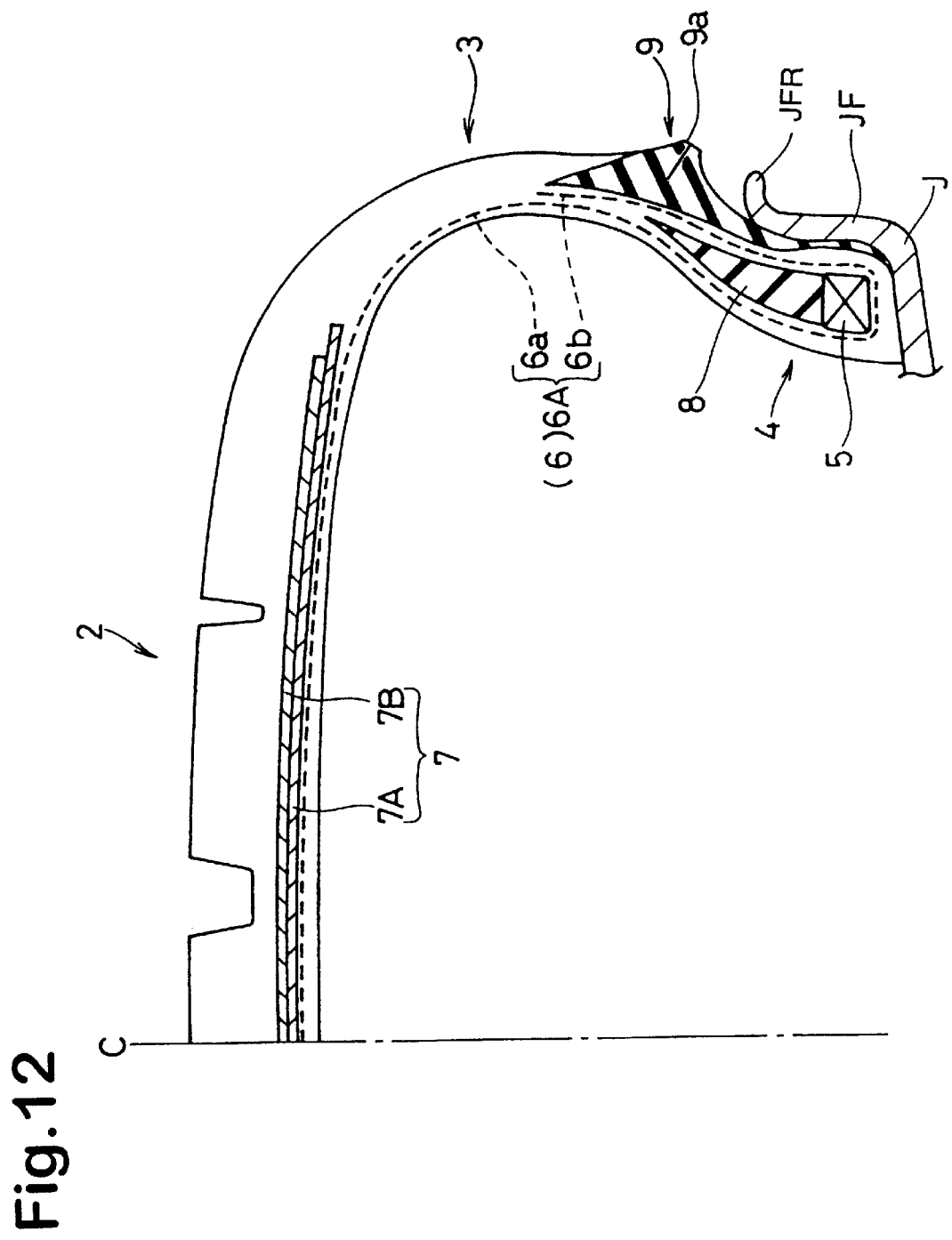
FIG. 12 is a cross sectional view of another embodiment of the present invention.
Figure 13:
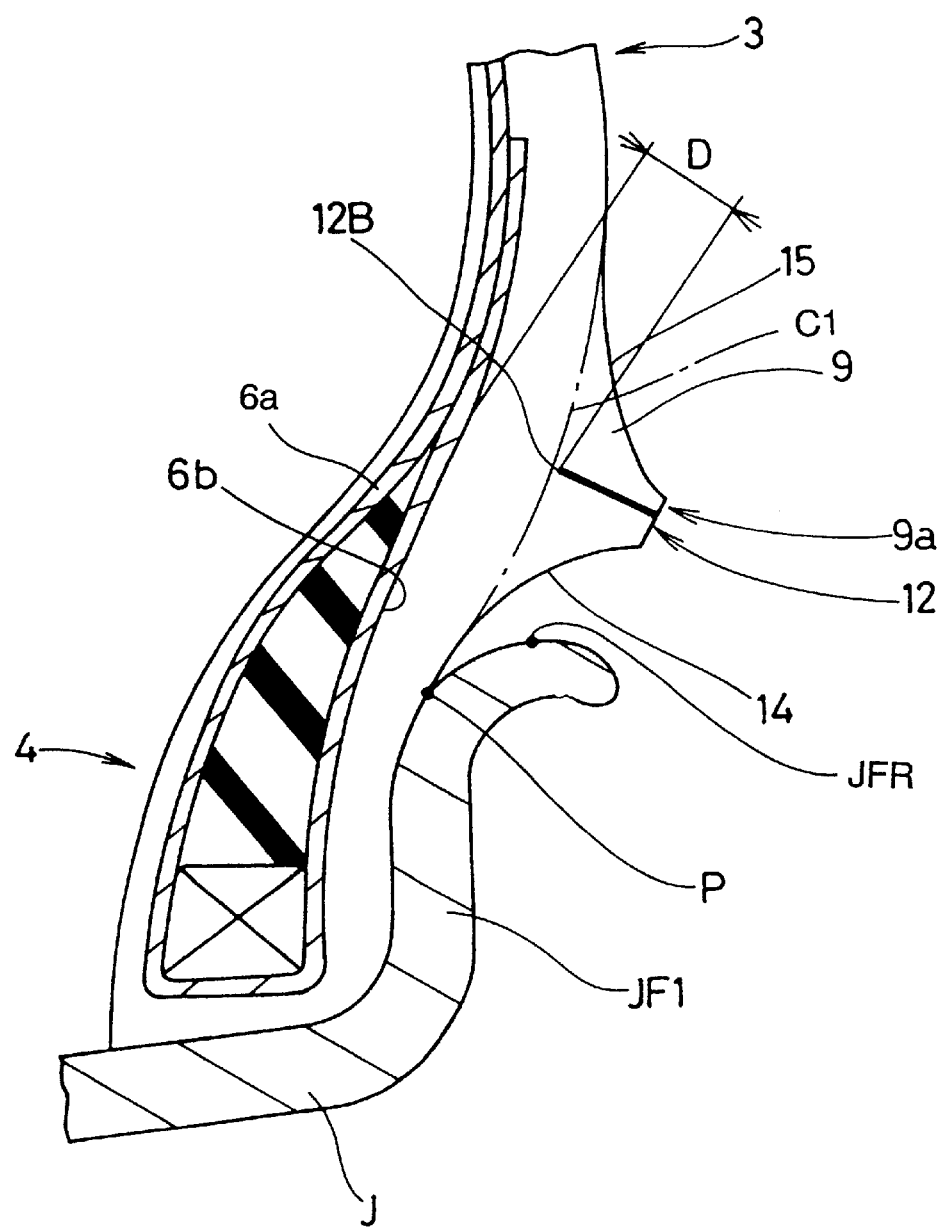
FIG. 13 is an enlarged cross sectional view showing the wheelrim protector thereof.

In the embodiments shown in FIGS. 1, 7 and 12, the carcass 6 is composed of a single ply 6A of cords arranged at 90 degrees with respect to the tire equator C. The carcass ply 6A extends between the bead portions 4 through the tread portion 2 and sidewall portions 3 and is turned up around the bead core 5 in each of the bead portions 4 from the inside to the outside of the tire to form a pair of turnup portion 6b and a main portion 6a therebetween.

Belt

The belt comprises a breaker 7 and optionally a band.

The breaker 7 comprises at least two cross plies of parallel cords laid at narrow angles of from 10 to 45 degrees with respect to the tire equator.

In the embodiments shown in FIGS. 1, 7 and 12, the breaker consists of two cross plies 7A and 7B of steel cords.

The band (not shown) is disposed radially outside the breaker 7 and is made of spiral windings of at least one cord or at least one ply of rubberized parallel cords, wherein the cord angle is substantially zero with respect to the tire equator. For the band cords, low elastic modulus organic fiber cords are used.

Bead Apex

The bead portions 4 are each provided with a bead apex 8 made of hard rubber.

In the embodiments shown, the bead apex 8 is disposed between the turnup portion 6b and main portion 6a of the carcass ply 6A so as to extend and taper radially outwardly from the bead core 5.

Rim Protector

According to the present invention, a wheelrim protector 9 is disposed in at least one of the sidewall portions 3 which is located on the outside of a vehicle to which the tire is attached.

In the embodiments shown in FIGS. 1, 7 and 12, each of the sidewall portions 3 is provided with a wheelrim protector 9.

The wheelrim protector 9 is defined as a portion formed near the bead portion 4 and protruding from a circular arc C1.

Under the above-mentioned normal condition, the circular arc C1 is defined as having the center O on an axial line N passing an axially outmost point Cm of the thickness center line 6CL of the carcass main portion; passing through a point M on the outer surface of the tire at the same radial height as the point Cm; and circumscribing a curved surface JFR of a flange JF of a standard wheelrim J.

The protector 9 is made of hard rubber having excellent resistance to wear and abrasion. The protector 9 can be formed by utilizing a sidewall rubber disposed axially outside the carcass to define the sidewall portion. However, it is also possible to form the protector by utilizing a so called clinch rubber disposed along the surface of the bead portion to contact with the wheelrim as shown in FIGS. 7 and 12.

The wheelrim protector 9 is the area axially outward of the circular arc, C1, in the bead region of the tire, and has a profile comprising a middle part 13, a radially inside part 14, and a radially outside part 15, wherein the middle part 13 is substantially flat, and the inside part 14 and outside part 15 are concavely curved to merge into the circular arc C1. The inside part 14 is spaced apart from the wheelrim flange JF.

The protector 9 has a vertex 9a in the flat part 13. The vertex 9a is a point at which the rubber thickness measured from the circular arc C1 along the normal direction thereto becomes maximum, and this maximum thickness Tmax is set in the range of from 3 to 20 mm, preferably 4 to 20 mm, more preferably 5 to 20 mm, still more preferably 7 to 18 mm. If the maximum thickness Tmax is less than 3 mm, it is difficult to protect the rim flange. If more than 20 mm, the tire weight excessively increases. The vertex 9a must be located axially outwards of the axially outer end of the rim flange JF.

The difference (Hf−Hr) of the radial height Hf of the vertex 9a from the radial height Hr of the wheelrim flange JF is not less than 0.5 mm, preferably not less than 2 mm, more preferably not less than 3 mm, still more preferably not less than 5 mm.

Further, the difference (Hf−Hr) is set to be not more than 0.45 times, preferably not more than 0.30 times, more preferably not more than 0.20 times the radial height Hw of the maximum carcass width point. Here, each radial height is measured from the bead base line BL. When the vertex 9a has a certain radial extent, the above-mentioned height Hf is defined as of the radially innermost position.

If the difference (Hf−Hr) is less than 0.5 mm, tire bead unseating is liable to occur and the mounting operation is difficult. If the difference (Hf−Hr) is more than 0.45 times the height Hw, it becomes difficult to protect the rim flange.

First Embodiment

FIG. 1 shows a first embodiment according to the present invention which is a passenger car tire having an aspect ratio of not more than 65%.

The carcass 6 comprises at least one ply of cords arranged radially at an angle of 70 to 90 degrees with respect to the tire equator C.

The breaker 7 comprises at least two cross plies of parallel cords laid at narrow angles of from 10 to 45 degrees with respect to the tire equator.

Slit

In this embodiment, the wheelrim protector 9 is provided with at least one slit 11 extending continuously in the circumferential direction.

The slit 11 has a depth d of not less than 2.5 mm and not more than 0.5 times the length L of the protector 9 measured along the circular arc C1.

Preferably, the depth d is not less than 4 mm and not more than 0.3 times the protector length L.

It is necessary that the bottom of the slit 11 does not reach the circular arc C. If it reaches the circular arc C1, an essential durability is lost.

Preferably, the sectional area Sg of the slit 11 is set in the range of 5 to 43%, preferably 10 to 43%, more preferably 15 to 43% of the overall sectional area Sf of the protector. The overall sectional area Sf is defined between the circular arc C1 and the outer surface of the tire, including the groove sectional area Sg. In case a plurality of slits 11 are provided, the sectional area Sg means the total thereof.

Figure 2:
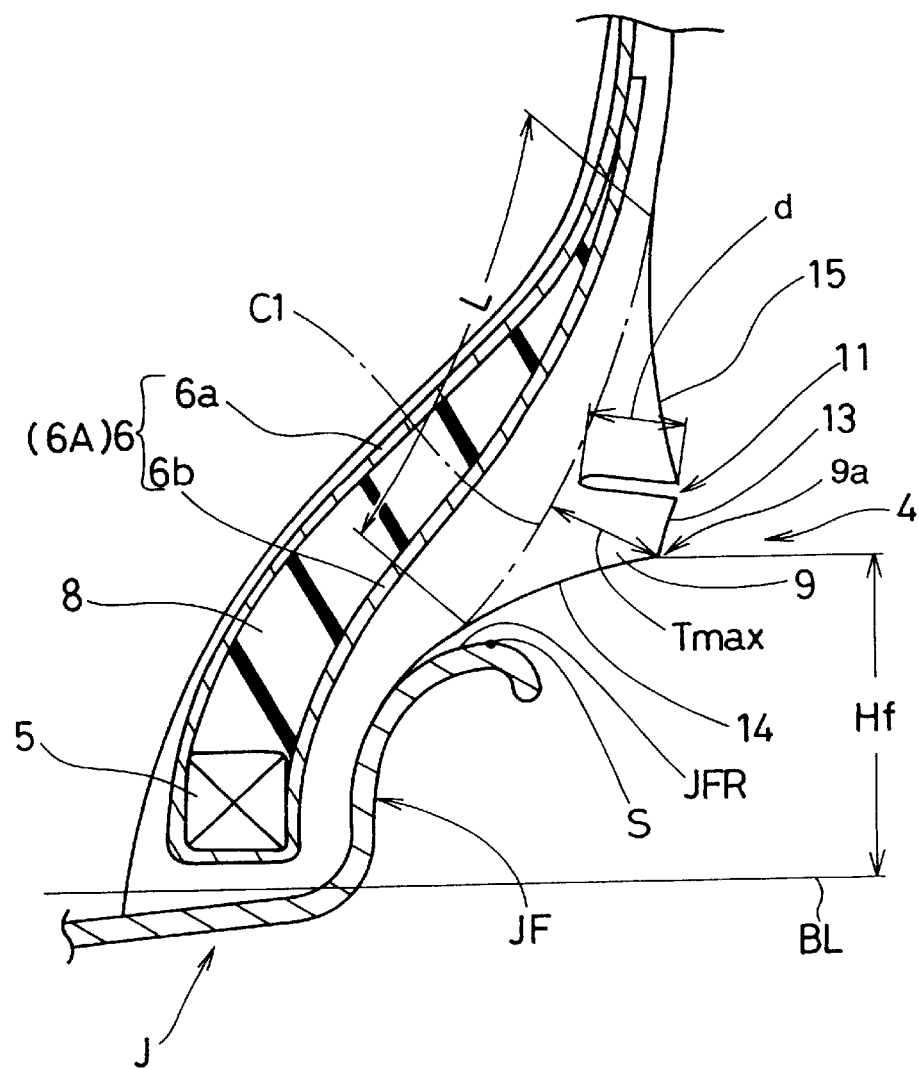
FIG. 2 is an enlarged cross sectional view showing the wheelrim protector thereof.
Figure 4A:
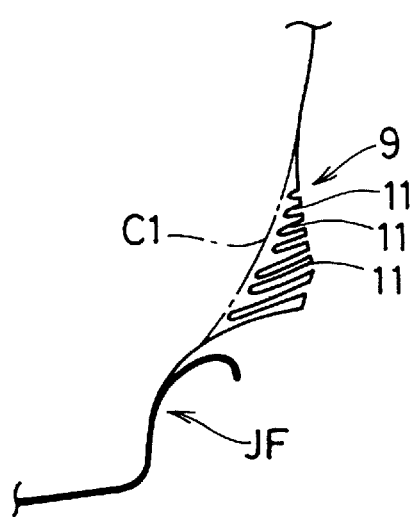
Figure 4B:
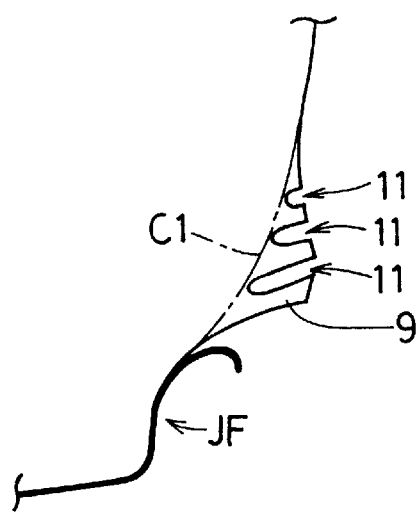

FIG. 4(A) and FIG. 4(B) show modifications of the protector 9 shown in FIG. 2, wherein the protector 9 is provided with a plurality of slits 11. The depths of the slits increase from the radially outside to the inside of the tire. These structures can display an excellent heat radiation effect and thus the bead durability may be further improved.

Therefore, if the radially inside part 14 of the protector 9 comes in contact with the flange JF during cornering, as the protector 9 can be deformed around the position of the circumferential slit 11, the abrupt rigidity change can be prevented.

If the depth d is less than 2.5 mm or the sectional area Sg is less than 5%, it becomes difficult to obtain a sufficient deformation of the protector 9.

If the depth d is more than 0.5 times the length L or the sectional area Sg is more than 43%, the strength of the protector 9 decreases and it becomes difficult to protect the rim flange.

Comparison Test 1

Test tires of size 225/50R16 (Rim size: 16X73J) having specifications shown in Table 1 were made and tested for rim protection, high speed cornering performance, and bead durability.

Rim Protection Test

At a slow speed of 5 km/h, the test tire was approached a curb at an angle of 5 degrees, and after the sidewall portion came into contact with the curb, the tire was run five meters in parallel with the curb. Then, the wheelrim was checked for damage.

High Speed Cornering Test

A Japanese 3000 cc FR passenger car provided with test tires was run on 80R and 100R corners at high speed, and the steering stability in a transition period of cornering was evaluated by the test driver's feeling.

Bead Durability Test

Using a tire testing drum, the test tire inflated to a normal pressure of 250 kPa was run at a speed of 60 km/h under over load of 1512 kgf, and the running time until a visible damage occurred in the bead portion was measured.

The test results are indicated in Table 1, using an index based on Ref.A1 being 100. The larger the index, the better the test result.

Figure 3A:
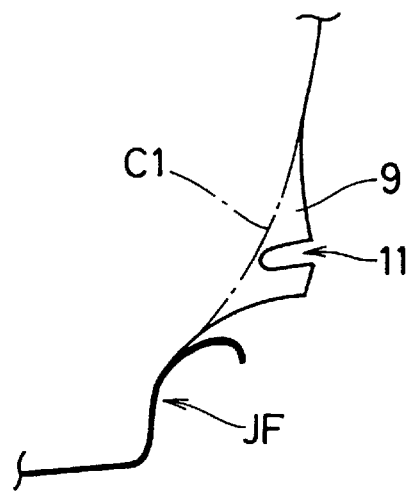
FIGS. 3(A) to 3(D), FIGS. 4(A) to 4(B), FIGS. 5(A) to 5(B) are schematic cross sectional views each showing another example of the slit.

FIG. 3(A): The circumferential slit 11 is wider than that in FIG. 1.

Figure 3B:
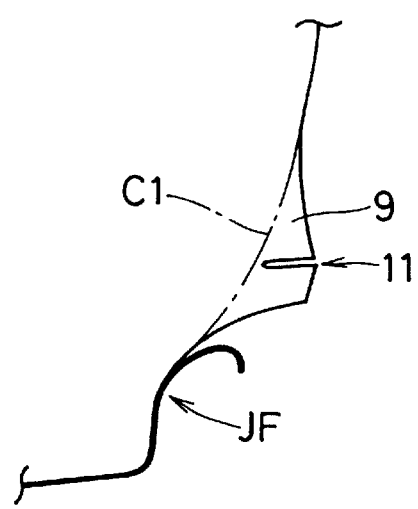

FIG. 3(B): The circumferential slit 11 is narrower than that in FIG. 1.

Figure 3C:
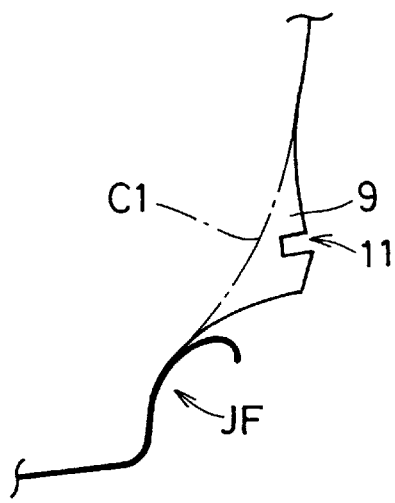

FIG. 3(C): The circumferential slit 11 has a rectangular sectional shape.

Figure 3D:
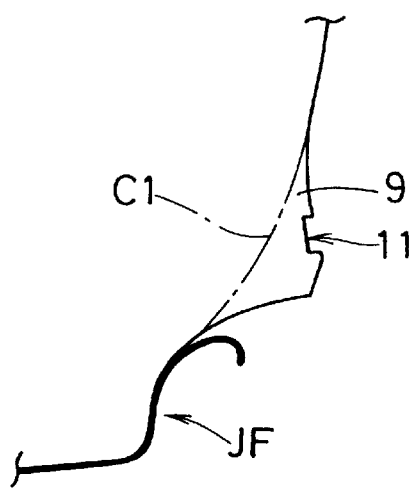

FIG. 3(D): The circumferential slit 11 has a width larger than the depth.

Figure 5A:
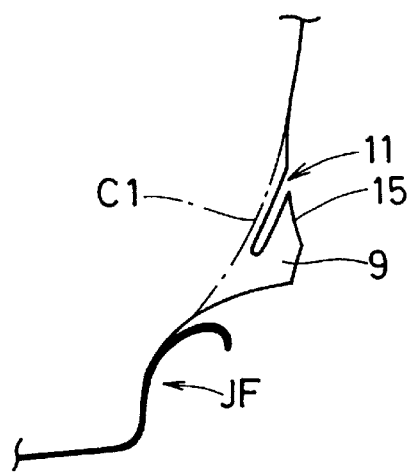

FIG. 5(A): The protector 9 is provided with a circumferential slit 11 extending from the radially outside part 15 of the protector 9 towards the radially inside.

Figure 5B:
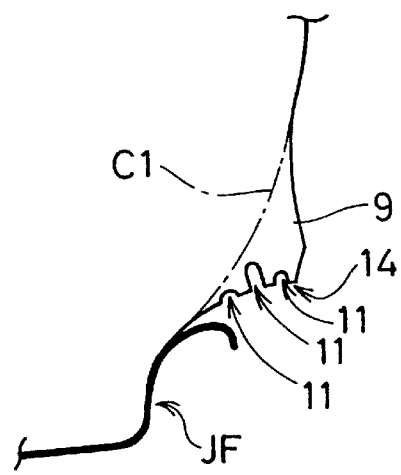

FIG. 5(B): The protector 9 is provided with a plurality of slits 11 extending from the radially inside part 14 of the protector 9 towards the radially outside.

Figure 6:
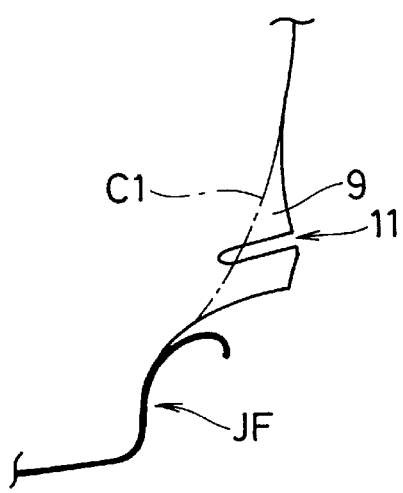
FIG. 6 is a schematic cross sectional view showing an undesirable slit.

FIG. 6: The circumferential slit 11 extends over the circular arc C1.

From the test results, it was confirmed that Example tires can be improved in the rim protection and high speed cornering stability.

Second Embodiment

FIG. 7 shows a second embodiment according to the present invention which is a passenger car tire having an aspect ratio of not more than 50%. (in this example 45%)

The carcass 6 comprises at least one ply of cords arranged radially at an angle of 75 to 90 degrees with respect to the tire equator C.

The breaker 7 comprises at least two cross plies of parallel cords laid at narrow angles of from 10 to 40 degrees with respect to the tire equator.

Slit

The wheelrim protector 9 is provided in the middle part 13 with at least one slit 11 extending continuously in the circumferential direction.

TABLE 1

| Tire | Ex. A1 FIG. 1 | Ex. A2 FIG. 1 | Ex. A3 FIG. 3(A) | Ex. A4 FIG. 3(B) | Ex. A5 FIG. 3(C) | Ex. A6 FIG. 5(A) | Ex. A7 FIG. 4(B) | Ex. A8 FIG. 4(A) | Ex. A9 FIG. 5(B) | Ex. A10 FIG. 3(D) |
|---|---|---|---|---|---|---|---|---|---|---|
| Slit | | | | | | | | | | |
| Number on each side | 1 | 1 | 1 | 1 | 1 | 1 | 3 | 7 | 3 | 1 |
| Vertex height Hf (mm) | 43 | 18.5 | 23 | 23 | 23 | 23 | 23 | 23 | 23 | 23 |
| Hf-Hr (mm) | 25 | 0.5 | 5 | 5 | 5 | 5 | 5 | 5 | 5 | 5 |
| (Hf-Hr)/Hw | 0.45 | 0.01 | 0.09 | 0.09 | 0.09 | 0.09 | 0.09 | 0.09 | 0.09 | 0.09 |
| Maximum thickness Tmax (mm) | 4 | 20 | 7 | 7 | 7 | 7 | 7 | 7 | 7 | 7 |
| Depth d (mm) | 4 | 7 | 7 | 7 | 25 | 14 | 9 | 12 | 5 | 1 |
| Sg/Sf | 0.17 | 0.17 | 0.17 | 0.05 | 0.05 | 0.14 | 0.43 | 0.39 | 0.2 | 0.05 |
| Rim protection | 100 | 100 | 100 | 100 | 100 | 100 | 99 | 100 | 100 | 100 |
| High speed cornering performance | 116 | 114 | 116 | 106 | 108 | 110 | 116 | 112 | 109 | 106 |
| Bead durability | 100 | 100 | 100 | 99 | 100 | 100 | 100 | 100 | 100 | 100 |

Figure 19:
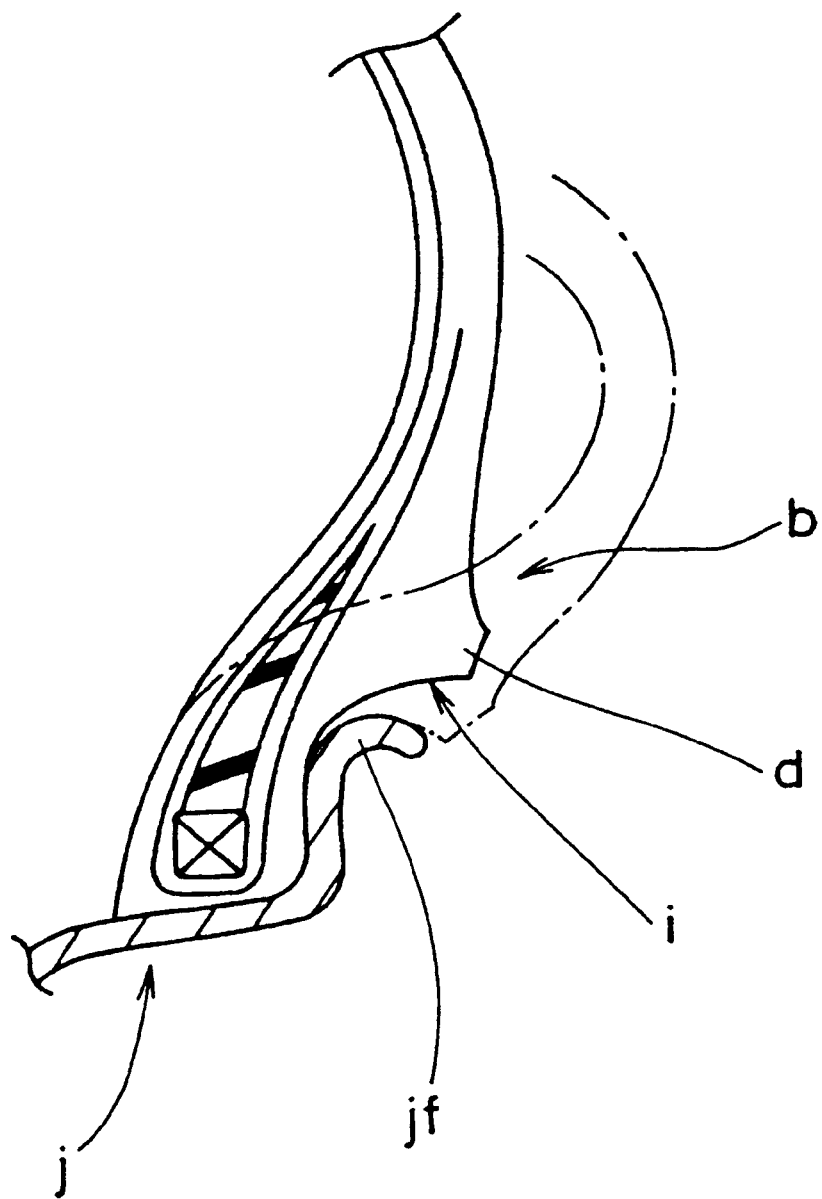
FIG. 19 is a cross sectional view showing a prior art wheelrim protector.

| Tire | Ex. A11 FIG. 3(A) | Ex. A12 FIG. 3(D) | Ref. A1 FIG. 19 | Ref. A2 FIG. 19 | Ref. A3 FIG. 19 | Ref. A4 FIG. 6 | Ref. A5 FIG. 3(A) |
|---|---|---|---|---|---|---|---|
| Slit | | | | | | | |
| Number on each side | 1 | 3 | 0 | 0 | 0 | 1 | 1 |
| Vertex height Hf (mm) | 23 | 23 | 23 | 45 | 18 | 23 | 23 |
| Hf-Hr (mm) | 5 | 5 | 5 | 27 | 0 | 5 | 5 |
| (Hf-Hr)/Hw | 0.09 | 0.09 | 0.09 | 0.49 | 0 | 0.09 | 0.09 |
| Maximum thickness Tmax (mm) | 7 | 7 | 7 | 4 | 20 | 7 | 7 |
| Depth d (mm) | 7 | 9 | — | — | — | 10 | 16 |
| Sg/Sf | 0.03 | 0.5 | — | — | — | 0.05 | 0.15 |
| Rim protection | 100 | 98 | 100 | 100 | 100 | 100 | 100 |
| High speed cornering performance | 102 | 117 | 100 | 100 | 100 | 114 | 110 |
| Bead durability | 100 | 100 | 100 | 100 | 100 | 80 | 100 |

Flange height Hr = 18 mm, Maximum carcass width height Hw = 55 mm

In this embodiment, the slit 11 has a wedge-shaped cross sectional shape, and thus, the width gradually decreases from the top to the bottom of the slit.

The distance D between the bottom 11B of the slit 11 and the adjacent carcass ply cords is not less than 2 mm, preferably more than 2 mm, but preferably not more than 5.0 mm. If the distance D is less than 2 mm, a crack reaching to the carcass cords is liable to occur at the groove bottom 11B, and the tire durability is greatly decreased.

Figure 8:
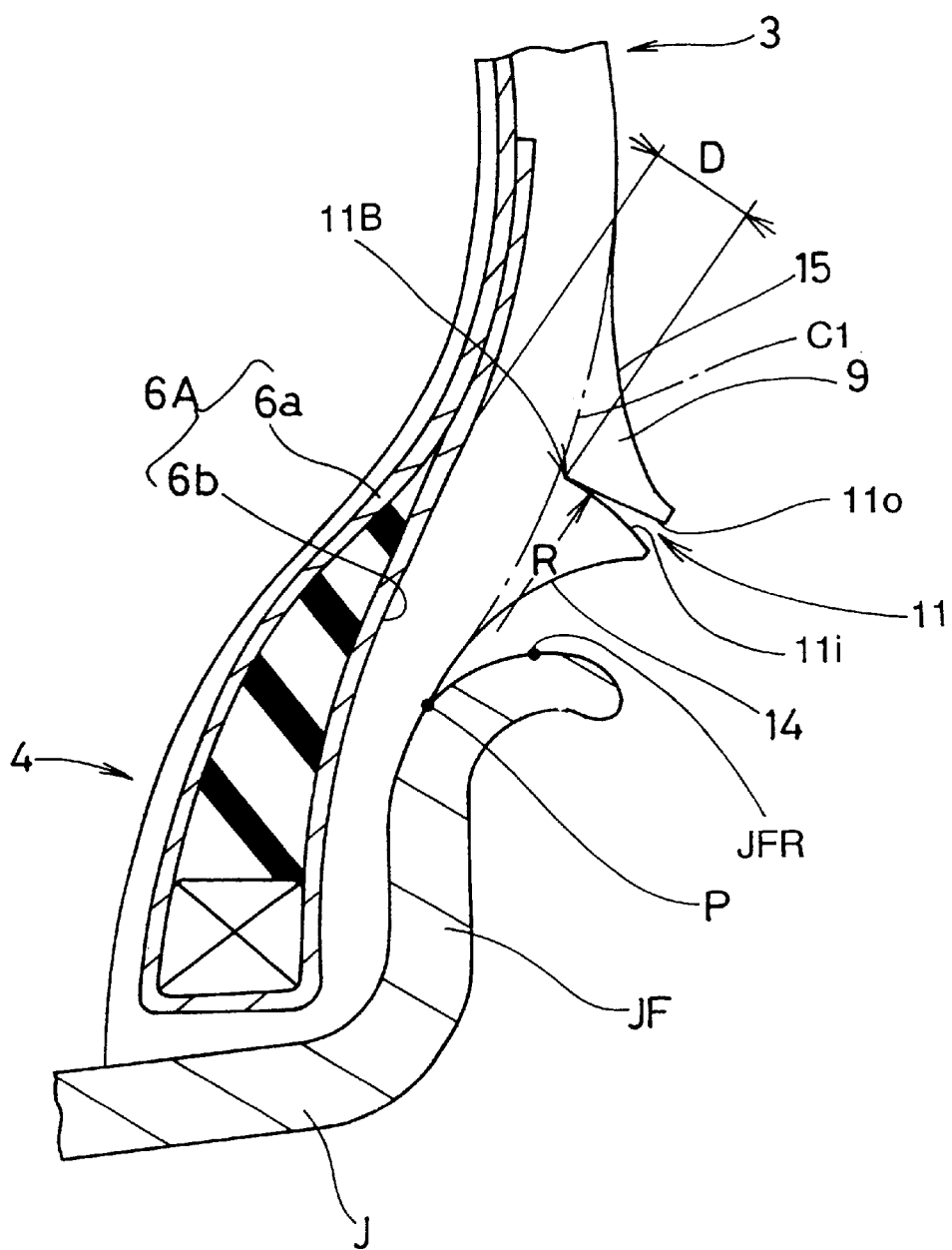
FIG. 8 is an enlarged cross sectional view showing the wheelrim protector thereof.

As to the groove walls of the slit 11, it is preferable that the radially outer wall 11o is substantially straight, but the radially inner wall 11i is convexly curved, as shown in FIG. 8. In this example, the radius of curvature R thereof is about 10 mm.

Figure 10A:
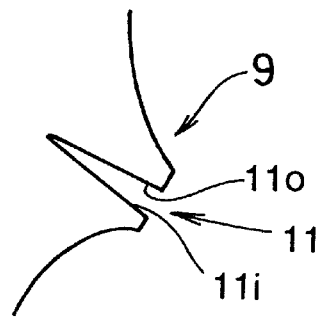
FIGS. 10(A) to 10(C) are cross sectional views each showing another example of the slit.
Figure 10B:
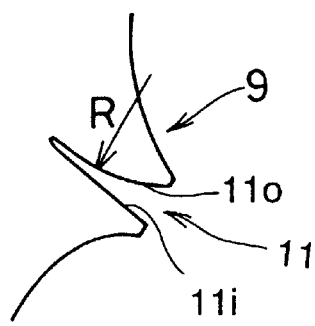

In FIG. 10(B), by contrast, the outer groove wall 11o is convexly curved, and the inner groove wall 11i is straight. This structure is also preferable.

In those structures, as the load increases, the inner and outer groove walls 11i and 11o contact each other, and the contact area gradually increases. As a result, the tire rigidity gradually increases. Therefore, abrupt changes in the tire characteristics during cornering can be avoided to improve the controllability.

Figure 10C:
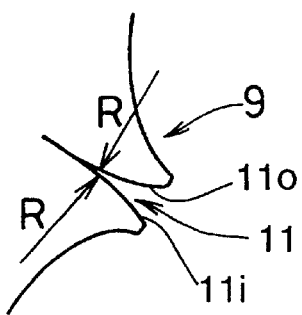

Further, as shown in FIG. 10(C), it is also possible that both the inner and outer groove walls 11i and 11o are convexly curved.

Furthermore, it may be possible that both the inner and outer groove walls 11i and 11o are straight as shown in FIG. 10(A).

As to the width of the slit 11, it is preferable that, when a side force is applied to the tire which is mounted on a standard wheelrim and inflated to a standard inner pressure and loaded with a standard load, the top of the slit does not close until the side force reaches to 1.8 G at least. In this embodiment, thus, the slit width at the top is set in the range of from 2 to 5 mm, more preferably 2 to 4 mm. (in this example 3 mm)

The depth of the slit 11 may be set in the range of from 6 to 10 mm. (in this example 7 mm)

Preferably, the bottom of the slit 11 is rounded by an arc having a radius of 0.5 to 1.0 mm to prevent stress concentration.

In a tire meridian section, the center line of the slit 11 in this embodiment extends along a normal direction to the circular arc C1. However, it is also possible to extend along another direction for example the axial direction of the tire.

Therefore, when the vertical load is applied, as the protector 9 can be deformed due to the slit, the ride comfort can be improved.

During cornering, if the sidewall portion on the outside of the vehicle is deformed from a situation shown in FIG. 9(A) to a situation shown in FIG. 9(B) and the protector 9 comes into contact with the rim flange JF, as the slit having a certain width is present, the protector 9 can be further deformed with decreasing the slit width as shown in FIG. 9(C). Thus, a dangerous abrupt rigidity change can be avoided.

Comparison Test 2

Test tires of size 215/45R17 (Rim size: 17X7.0JJ) were made and tested for the ride comfort, steering stability, bead durability, tire weight Ride Comfort Test and Steering Stability Test A test car provided on all the four wheels with test tires was run on a dry asphalt paved road surface of a tire test course. And based on the test driver's feeling, harshness, push-up, damping and the like were evaluated as the ride comfort, and further controllablity and the like at a critical cornering speed was evaluated as the steering stability. The results are indicated by an index based on Prior Art tire being 100. The larger the index, the better the performance.

Bead Durability Test

Using a tire testing drum, the test tire inflated to 300 kPa was run at a speed of 60 km/h under over load of 10.07 kN, and the running time until a visible damage was caused in the bead portion was measured. The results are indicated by an index based on Prior Art tire being 100. The large the index, the better the durability.

Tire Weight

The tire weight is indicated by an index based on Prior Art tire being 100. The smaller the index, the lighter the tire weight.

The test results are shown in Table 2.

TABLE 2

Figure 11:
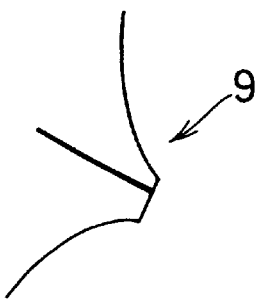
FIG. 11 is a cross sectional view of a slit used in comparison tests.

| Tire | Prior | Ex.B1 | Ex.B2 |
| --- | --- | --- | --- |
| Slit | | | |
| Shape | FIG.11 | FIG.10(A) | FIG.8* |
| Top width (mm) | 1 | 3 | 3 |
| Depth (mm) | 7 | 7 | 7 |
| Ride comfort | 100 | 130 | 130 |
| Steering stability | 100 | 115 | 120 |
| Bead durability | 100 | 130 | 130 |
| Tire weight | 100 | 99 | 99 |

*R = 10.0 mm

From the test results, it was confirmed that Example tires can be improved in the ride comfort and controllability.

Third Embodiment

FIG. 12 shows a third embodiment of the present invention which is a passenger car tire having an aspect ratio of not more than 50%. (in this example 45%)

The carcass 6 comprises at least one ply of cords arranged radially at an angle of 75 to 90 degrees, preferably 80 to 90 degrees with respect to the tire equator C.

The breaker 7 comprises at least two cross plies of parallel cords laid at narrow angles of from 10 to 40 degrees with respect to the tire equator.

Slit

In this embodiment, the wheelrim protector 9 is provided with a plurality of slits 12.

The slits 12 are arranged around the tire axis at regular angle pitches.

The number of the slits 12 on each protector 9 is set to be not less than 5, preferably not less than 10, more preferably not less than 20.

Figure 15:
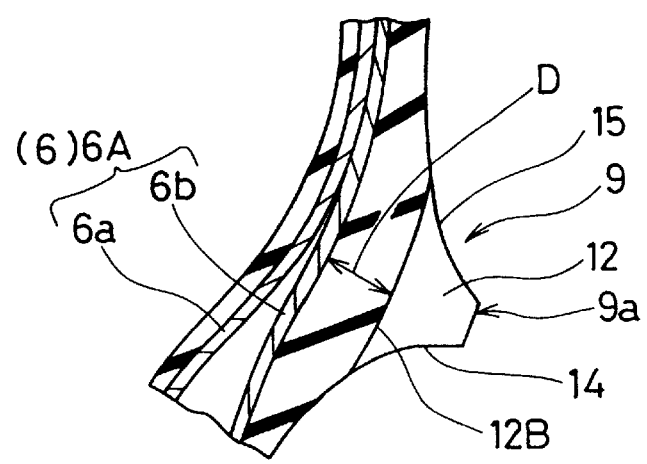
FIG. 15 is a sectional view taken along a line X—X of FIG. 14.

As shown in FIG. 15, every slits 12 extends from the radially outside part 15 to the radially inside part 14 across the protector 9.

Figure 14:
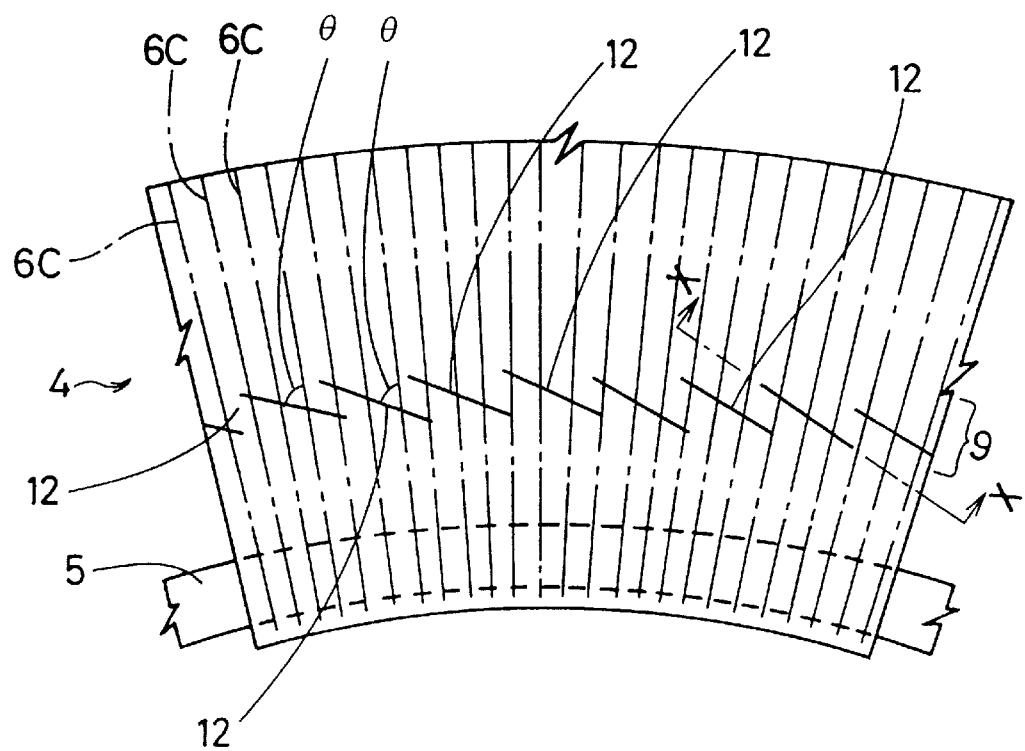
FIG. 14 is a side view showing the inclination of the discontinuous slits thereof in relation to carcass cords.

As shown in FIG. 14, the slits 12 on each protector 9 are inclined to one circumferential direction at an angle θ of from 45 to 80 degrees, preferably 45 to 70 degrees, with respect to the adjacent carcass cords 6C (in this example the cords of the carcass ply turnup portion 6b). As a result, a directional rigidity is provided in the lower sidewall portion and the steering stability can be improved In this example, along the tire circumferential direction, the slits 12 overlap each other in the circumferential end portions. Such overlaps are however not always necessary.

The width of the slits 12 is not less than 0.5 mm, preferably 0.5 to 3.0 mm, more preferably 0.5 to 2.0 mm, still more preferably 0.5 to 1.5 mm.

The distance D from the bottom 12B of the slits 12 to the adjacent carcass cords is not less than 2.0 mm, preferably 2.0 to 5.0 mm.

The depth of the slits 12 is 6 to 10 mm. (in this example about 7 mm)

Preferably, the bottom 12B of the slits 12 is rounded by an arc having a radius of 0.5 to 1.0 mm to prevent cracking.

If the angle is less than 45 degrees or the width is less than 0.5 mm, it becomes difficult to obtain a sufficient deformation of the protector 9. If the angle is more than 80 degrees, the steering stability is liable to decrease. If the distance D less than 2.0 mm, durability greatly decreases.

Figure 16:
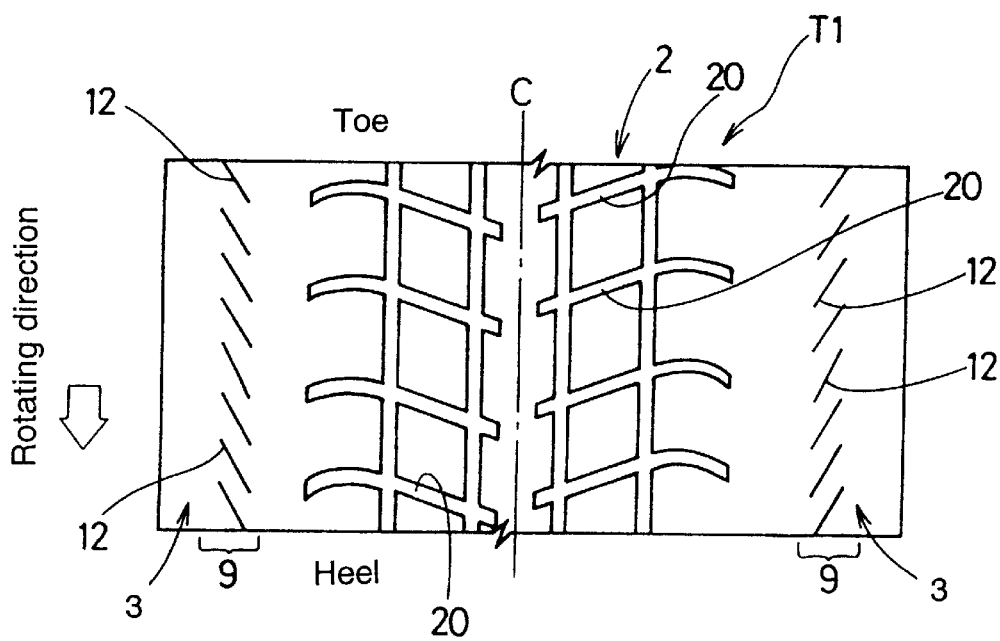
FIG. 16 and FIG. 17 are developed views of the tread portion and sidewall portions showing the inclinations of the discontinuous slits and tread grooves.

In FIG. 16, the tire is provided with tread grooves 20 defining a directionally bound tread pattern T1, and the slits 12 on both sides of the tire are inclined in one circumferential direction. Thus, in the developed view, the slits 12 are symmetrical about the tire equator C. In this example, the inclining direction of the slits 12 is equal to the designed rotating direction of the tire which is usually indicated in the sidewall portions. By inclining in this way, a full bead reinforcing effect can be obtained by the protector 9, and a rigidity balance between the two bead portions can be kept, and an excellent steering stability can be obtained.

Figure 17:
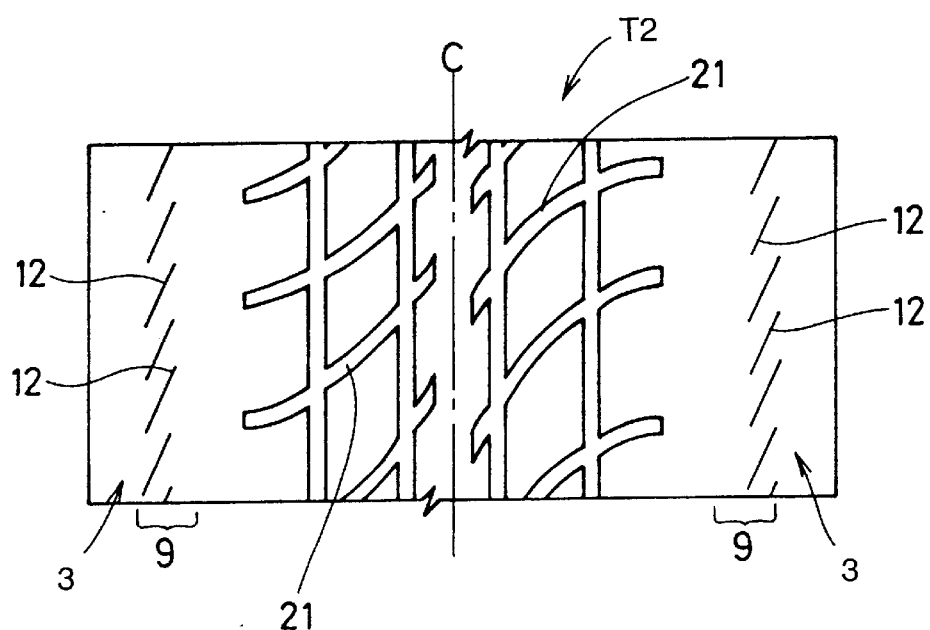

In FIG. 17, the tire is provided with tread grooves 21 defining a bi-directional tread pattern T2, and the inclining direction of the slits 12 on one side of the tire is reversed to that on the other side. Thus, in the developed view, the slits 12 are arranged symmetrically about finite number of points on the tire equator C.

In any case (FIG. 16 or FIG. 17), in each half on one side of the tire equator, the inclining direction of the slits 12 is the same as the inclining direction of the axial grooves (20, 21).

In the above-mentioned examples, the slits are straight, but it can be curved.

Therefore, the slits 12 decrease the rigidity of the wheel-rim protector 9 and make it easier to deform the protector 9 when the vertical load is applied. Thus, the ride comfort can be improved.

Figure 18A:
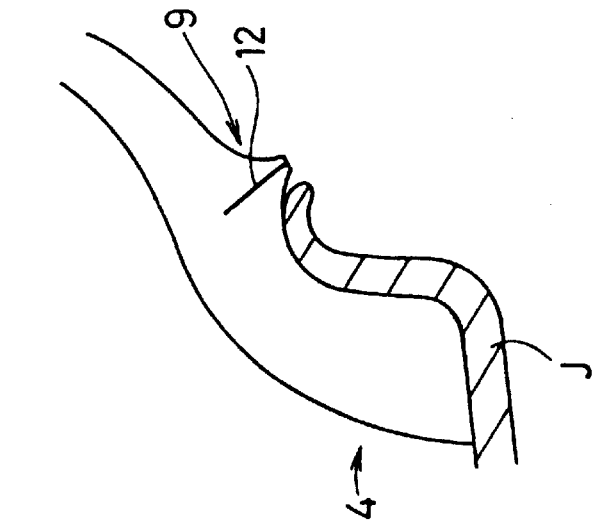
FIGS. 18(A) to 18(C) are schematic cross sectional views for explaining a function of the discontinuous slits.
Figure 18B:
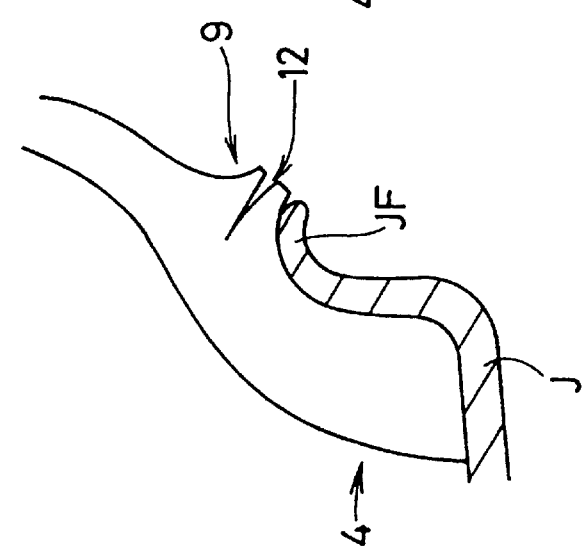
Figure 18C:
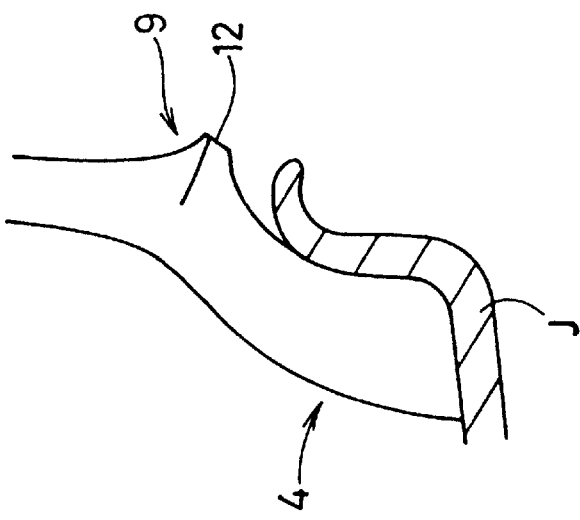

During cornering, if the sidewall portion on the outside of the vehicle is deformed from a situation shown in FIG. 18(A) to a situation shown in FIG. 18(B) and the protector 9 comes into contact with the rim flange JF, the slit opens. The side force to the tire is further increased, the slit width again decreases as shown in FIG. 18(C). As a result, a dangerous abrupt rigidity change can be avoided.

Comparison Test 3

Test tire of size 215/45R17 having specifications shown in Table 3 were made and tested for the ride comfort, steering stability, and bead durability.

Ride Comfort, Steering Stability and Bead Durability Tests

Same as above

The results are indicated in Table 3 by an index based on Prior Art tire being 100.

TABLE 3

| Tire | Prior | Ref.C1 | Ref.C2 | Ex.C1 | Ex.C2 |
|---|---|---|---|---|---|
| Slit | | | | | |
| Number on each side | 0 | 30 | 30 | 30 | 30 |
| Width (mm) | | 0.3 | 0.5 | 0.5 | 0.5 |
| Angle θ(deg) | | 70 | 40 | 70 | 45 |
| Distance D(mm) | | 3 | 3 | 3 | 3 |
| Ride comfort | 100 | 105 | 103 | 110 | 105 |
| Steering stability | 100 | 100 | 95 | 103 | 101 |
| Bead durability | 100 | 115 | 100 | 120 | 110 |

From the test results, it was confirmed that Example tires can be improved in the ride comfort, steering stability, and bead durability.

What is claimed is:

1. A pneumatic tire comprising
   a tread portion,
   a pair of sidewall portions,
   a pair of bead portions,
   a carcass extending between the bead portions,
   a wheelrim protector provided in at least one of said sidewall portions, said wheelrim protector protruding from a circular arc C1 so as to overhang a flange of a wheelrim when the tire is mounted thereon and to protrude axially outwardly from an axially outer end of the flange, wherein said circular arc C1 is defined as having the center on an axial line N passing maximum section width points of the carcass, and passing through a point M on the outer surface of the tire at the same radial height as the maximum section width points of the carcass, and circumscribing the flange of the wheelrim,
   said wheelrim protector having a vertex which defines a maximum thickness Tmax of 3 to 20 mm, the thickness being measured from the surface to said circular arc in the normal direction thereto, the difference (Hf−Hr) of the radial height Hf of the vertex from the radial height Hr of the rim flange being not less than 0.5 mm and not more than 0.45 times the radial height Hw of the maximum width point of the carcass, each radial height measured from a bead base line BL, and
   said wheelrim protector provided with at least one circumferential slit around the axis of the tire.

2. The pneumatic tire according to claim 1, wherein said at least one circumferential slit is a single slit that extends continuously in the tire circumferential direction.

3. The pneumatic tire according to claim 1, wherein said at least one circumferential slit is a plurality of slits that extend continuously in the tire circumferential direction.

4. The tire according to claim 1, wherein the depth of the slit is not less than 2.5 mm.

5. The tire according to claim 1, wherein the bottom of the slit does not reach the circular arc.

6. The tire according to claim 1, wherein the depth of the slit is not more than 0.5 times the distance L of the wheelrim protector measured along the circular arc C1 between the points of intersection with the axially outer portion of the sidewall.

7. A pneumatic tire comprising
a tread portion,
a pair of sidewall portions,
a pair of bead portions,
a carcass extending between the bead portions,
a wheelrim protector provided in at least one of said sidewall portions, said wheelrim protector protruding from a circular arc C1 so as to overhang a flange of a wheelrim when the tire is mounted thereon and to protrude axially outwardly from an axially outer end of the flange, wherein said circular arc C1 is defined as having the center on an axial line N passing maximum section width points of the carcass, and passing through a point M on the outer surface of the tire at the same radial height as the maximum section width points of the carcass, and circumscribing the flange of the wheelrim,
said wheelrim protector provided with at least one circumferential slit around the axis of the tire, and
the total sectional area Sg of said at least one circumferential slit is 5 to 43% of the overall sectional area Sf of the wheelrim protector.

8. The tire according to claim 3, wherein in a tire meridian section, said plurality of slits are inclined in substantially the same direction with respect to the axial direction of the tire.

9. A pneumatic tire comprising
a tread portion,
a pair of sidewall portions,
a pair of bead portions,
a carcass extending between the bead portions,
a wheelrim protector provided in at least one of said sidewall portions, said wheelrim protector protruding from a circular arc C1 so as to overhang a flange of a wheelrim when the tire is mounted thereon and to protrude axially outwardly from an axially outer end of the flange, wherein said circular arc C1 is defined as having the center on an axial line N passing maximum section width points of the carcass, and passing through a point M on the outer surface of the tire at the same radial height as the maximum section width points of the carcass, and circumscribing the flange of the wheelrim,
said wheelrim protector provided with at least one circumferential slit around the axis of the tire,
said at least one circumferential slit extending continuously in the circumferential direction of the tire,
in a meridian section of the tire, the width of the slit gradually decreasing from the top to the bottom thereof to have a wedge-shaped cross sectional shape,
the distance from the bottom of the slit to carcass cords being at least 2 mm, wherein
the slit has a radially inner wall and a radially outer wall, and in a meridian section of the tire, one of the inner wall and outer wall is convexly curved, and the other is convexly curved or substantially straight.

10. A pneumatic tire comprising
a tread portion,
a pair of sidewall portions,
a pair of bead portions,
a carcass extending between the bead portions,
said carcass comprises a ply of cords arranged radially of the tire,
a wheelrim protector provided in at least one of said sidewall portions, said wheelrim protector protruding from a circular arc C1 so as to overhang a flange of a wheelrim when the tire is mounted thereon and to protrude axially outwardly from an axially outer end of the flange, wherein said circular arc C1 is defined as having the center on an axial line N passing maximum section width points of the carcass, and passing through a point M on the outer surface of the tire at the same radial height as the maximum section width points of the carcass, and circumscribing the flange of the wheelrim,
said wheelrim protector provided with a plurality of slits disposed around the tire axis and inclined to one circumferential direction at an angle of 45 to 80 degrees with respect to the adjacent carcass cords,
the width of the slits being at least 0.5 mm, and
the distance from the bottom of the slits to the carcass cords being not less than 2.0 mm.

11. The pneumatic tire according to claim 10, wherein
said tread portion is provided with tread groves defining a directionally bound tread pattern,
said wheelrim protector with said a plurality of slits is provided on each side of the tire, and
all the slits on both sides of the tire are inclined to the same circumferential direction.

12. The pneumatic tire according to claim 10, wherein
said tread portion is provided with tread grooves defining a bi-directional tread pattern,
said wheelrim protector with said a plurality of slits is provided on each side of the tire, and
the slits on one side of the tire are inclined reversely to the slits on the other side.

* * * * *